United States Patent
Shridhar et al.

(10) Patent No.: US 10,127,291 B2
(45) Date of Patent: Nov. 13, 2018

(54) SYSTEM TO PERFORM IMPACT ANALYSIS OF OBJECTS

(71) Applicant: SAP SE, Walldorf (DE)

(72) Inventors: Archana Shridhar, Bangalore (IN); Sahana Durgam Udaya, Bangalore (IN)

(73) Assignee: SAP SE, Walldorf (DE)

( * ) Notice: Subject to any disclaimer, the term of this patent is extended or adjusted under 35 U.S.C. 154(b) by 308 days.

(21) Appl. No.: 14/963,429

(22) Filed: Dec. 9, 2015

(65) Prior Publication Data

US 2017/0169076 A1    Jun. 15, 2017

(51) Int. Cl.
*G06F 7/00* (2006.01)
*G06F 17/30* (2006.01)

(52) U.S. Cl.
CPC .. *G06F 17/30554* (2013.01); *G06F 17/30604* (2013.01)

(58) Field of Classification Search
None
See application file for complete search history.

(56) References Cited

U.S. PATENT DOCUMENTS

| | | | | |
|---|---|---|---|---|
| 5,613,039 A * | 3/1997 | Wang | ...................... | G01J 3/453 706/24 |
| 6,033,994 A * | 3/2000 | Tikhonov | .................. | B08B 3/12 134/1.3 |
| 6,194,803 B1 * | 2/2001 | Heim | ..................... | F16D 27/112 192/84.941 |
| 6,910,044 B2 * | 6/2005 | Weinberg | .............. | G06F 17/243 707/792 |
| 7,143,076 B2 * | 11/2006 | Weinberg | .......... | G06F 17/30569 |
| 8,161,087 B2 * | 4/2012 | Latzina | ............. | G06F 17/30306 707/805 |
| 8,165,987 B2 * | 4/2012 | Luk | ........................ | G06N 5/022 707/602 |
| 9,122,669 B2 * | 9/2015 | Demant | ................ | G06F 17/248 |
| 2002/0015361 A1 * | 2/2002 | Forbath | ................... | G04F 1/005 368/108 |
| 2004/0252121 A1 * | 12/2004 | Bhatt | ................ | G06F 17/30554 345/440 |
| 2007/0136116 A1 * | 6/2007 | Germeraad | ............ | G06Q 10/10 705/310 |
| 2007/0143247 A1 * | 6/2007 | Brunswig | ......... | G06F 17/30557 |
| 2010/0153466 A1 * | 6/2010 | Burger | .............. | G06F 17/30557 707/802 |

(Continued)

*Primary Examiner* — Daniel Kuddus
(74) *Attorney, Agent, or Firm* — Fish & Richardson P.C.

(57) ABSTRACT

Impact analysis of an object is performed by selecting an object and determining impacted objects corresponding to the object. A type of the object is determined. A query is formulated and executed to retrieve relationship objects from a relationship table matching the type of the selected object. Nested properties associated with the relationship objects for the individual relationship objects are determined iteratively. A parent property associated with the nested properties is identified. A query is formulated and executed to fetch dependent values corresponding to the dependent values. The dependent values are added to a list. A query is formulated and executed to determine impacted objects corresponding to the dependent values. The impacted objects are displayed in a graphical chart.

9 Claims, 8 Drawing Sheets

(56) References Cited

U.S. PATENT DOCUMENTS

| | | | | |
|---|---|---|---|---|
| 2010/0169310 A1* | 7/2010 | Latzina | ............ | G06F 17/30306 |
| | | | | 707/736 |
| 2012/0278815 A1* | 11/2012 | Balko | ................... | G06F 9/5055 |
| | | | | 719/313 |
| 2012/0323885 A1* | 12/2012 | Wang | ................ | G06F 17/30498 |
| | | | | 707/714 |
| 2013/0041925 A1* | 2/2013 | Balko | ....................... | G06F 8/67 |
| | | | | 707/810 |
| 2016/0243423 A1* | 8/2016 | Tuxen | ................ | A63B 24/0021 |

* cited by examiner

400A

| Publication Folder | | |
|---|---|---|
| Root Folder 95 | | |
| 542 OBJECTS | | |
| ☐ 4344 OBJECT A | | |
| ☐ 5265 OBJECT B (TYPE A) ← 402 | | |
| ☐ 5267 OBJECT C (TYPE A) | | |
| ☐ 5277 OBJECT D (TYPE A) | | |
| PROPERTY INSTANCE | | false |
| PROPERTY_INSTANCE_OBJECT | | false |
| ⊞ | | false |
| | TYPE (readOnly) | TYPE A |
| | SAMPLE_DOCUMENTS | |
| | NAME | OBJECT B |
| | OBJ_VERSION (hidden) | 8 |

Find Results

☐ 555 UserGroup-User (Relationship) 406
☐ 559 ServiceA-ServiceB (Relationship) 408
☐ 564 EventA-EventB (Relationship) 410

Find: QUERY ▶ SELECT * FROM TABLE A, TABLE B, TABLE C WHERE NAME LIKE '%-Type A' and RELATION_TALE_NAME = 'RELATIONSHIP_TABLE' 404

⎫
⎬ 412
⎭

| RELATION_ADD_PARENTS_AS_MEMBER | ADD_OBJECTS| |
|---|---|---|
| RELATION_CHILDREN_MEMBERS_PROPERTY | TYPE A | |
| ⊟ RELATION_CONSTRAINTS_FOR_EDGE | | |
| RELATION_CLAUSE 416 | | TYPE – 'Type A' 418 |
| RELATION_EDGE_TYPE | | ALL |
| ⊟ RELATION_SELECT_USING | | Parent |
| RELATION_LINK_TYPE | SOFT | |
| RELATION_PARENTS_PROPERTY | PARENT B 420 | |

⎫
⎬ 414
⎭

☐ 553 Install-Service (Relationship)
☐ 555 UserGroup-User (Relationship)
☐ 556 UserGroup-Folder (Relationship)
☐ 558 UserGroup-Unit (Relationship)
☐ 559 ServiceA-ServiceB (Relationship)
☐ 564 EventA-EventB (Relationship)
☐ 565 Profile A-Profile B (Relationship)
☐ 567 Service C-Service D (Relationship)

FIG. 4A

RADAR CHART A 504

RADAR CHART B 522

US 10,127,291 B2

SYSTEM TO PERFORM IMPACT ANALYSIS OF OBJECTS

FIELD

Embodiments of the invention generally relate to data processing, and more particularly to a system to perform impact analysis of objects.

BACKGROUND

Enterprises use Business Intelligence (BI) tools or applications such as reports, web intelligence, etc., to enable transforming raw data to useful analytics. Typically, BI tools are extensible, open-framework platform hosting both enterprise applications and third-party products. BI applications enable various functionalities such as reporting, online analytical processing, data mining, predictive analysis, etc. BI applications and tools may be used to process and analyze enormous amount of inter-related data inter-related to each other. A change or modification to one of entity such as database connections, queries, etc., in a BI application may impact various other related entities like report, chart, etc. It is challenging to identify the granular impact created by changing or modifying an entity in BI application.

BRIEF DESCRIPTION OF THE DRAWINGS

The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 4A and FIG. 4B are block diagrams in combination illustrating impact analysis, according to one embodiment.

DETAILED DESCRIPTION

Embodiments of techniques for system to perform impact analysis of objects are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
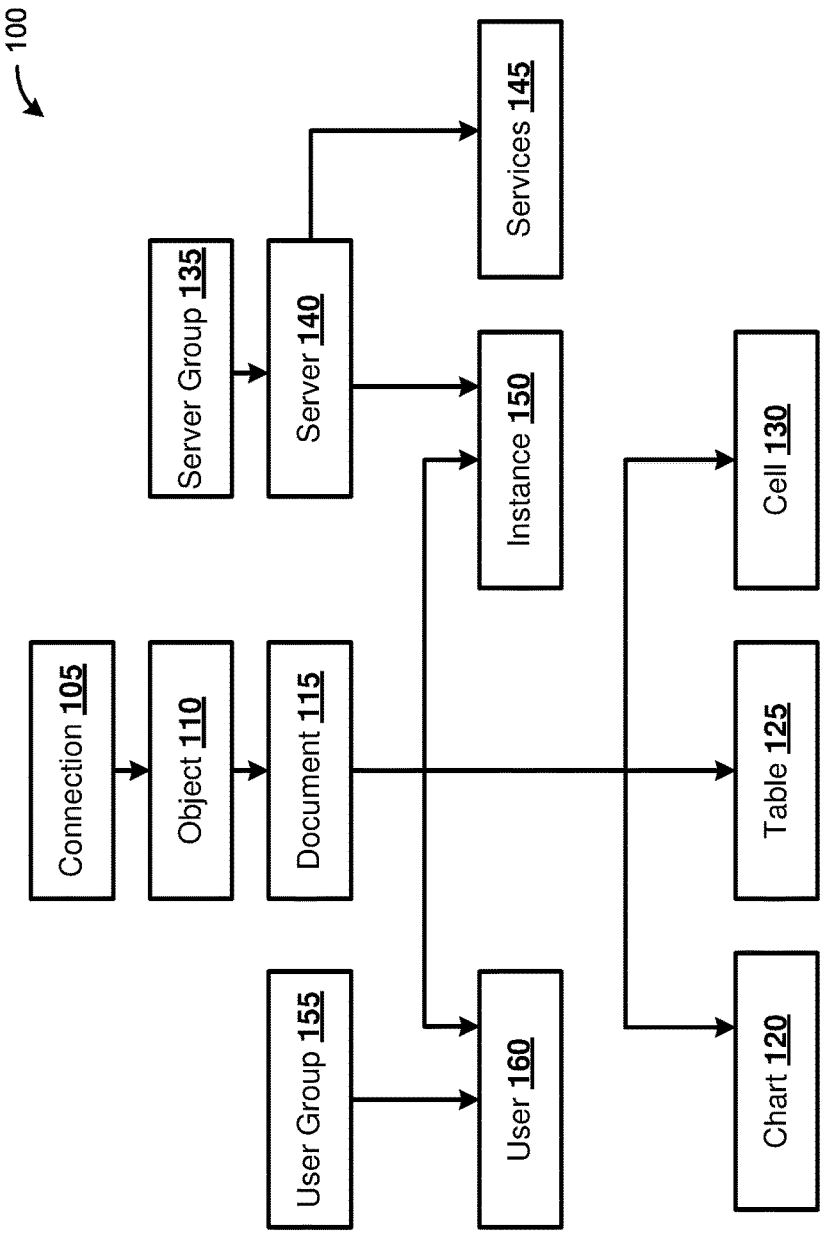
FIG. 1 is a block diagram illustrating an exemplary relationship between objects in a BI application scenario, according to an embodiment.

In a BI platform, individual entities are represented as objects or 'Info Objects'. For example individual entities such as users, servers, documents, universes, applications, etc., are represented as 'Info Objects'. Objects may be rows in a repository that store information about entities they represent. Objects may be collection of name-value pairs called properties in the repository. FIG. 1 is a block diagram illustrating an exemplary relationship between objects 100 in a BI application, according to one embodiment. Examples provided below in FIG. 1 to FIG. 5 are with reference to the BI application and are merely exemplary, however, any type of object in any enterprise application may be used. The inter-relationship between the various objects are as shown below. Connection object 105 holds connection parameters such as connection type, connection name, etc., between applications and databases. Object 110 uses the connection object 105 to establish connection with an enterprise application. Document 115 such as web intelligence document, reports, etc., may be generated from the object 110. Document 115 may be chart 120, table 125, cell 130, etc. Server group 135 maintains a list of servers and parameters associated with the servers. Server 140 is one such server from the server group 135. Services associated with the server 140 are maintained in the object services 145. An instance 150 of the document 115 is created in the server 140 maintained in a server group 135. Users associated with the BI application are maintained in a user group 155. User 160 is one such user from the user group 155.

Figure 2:
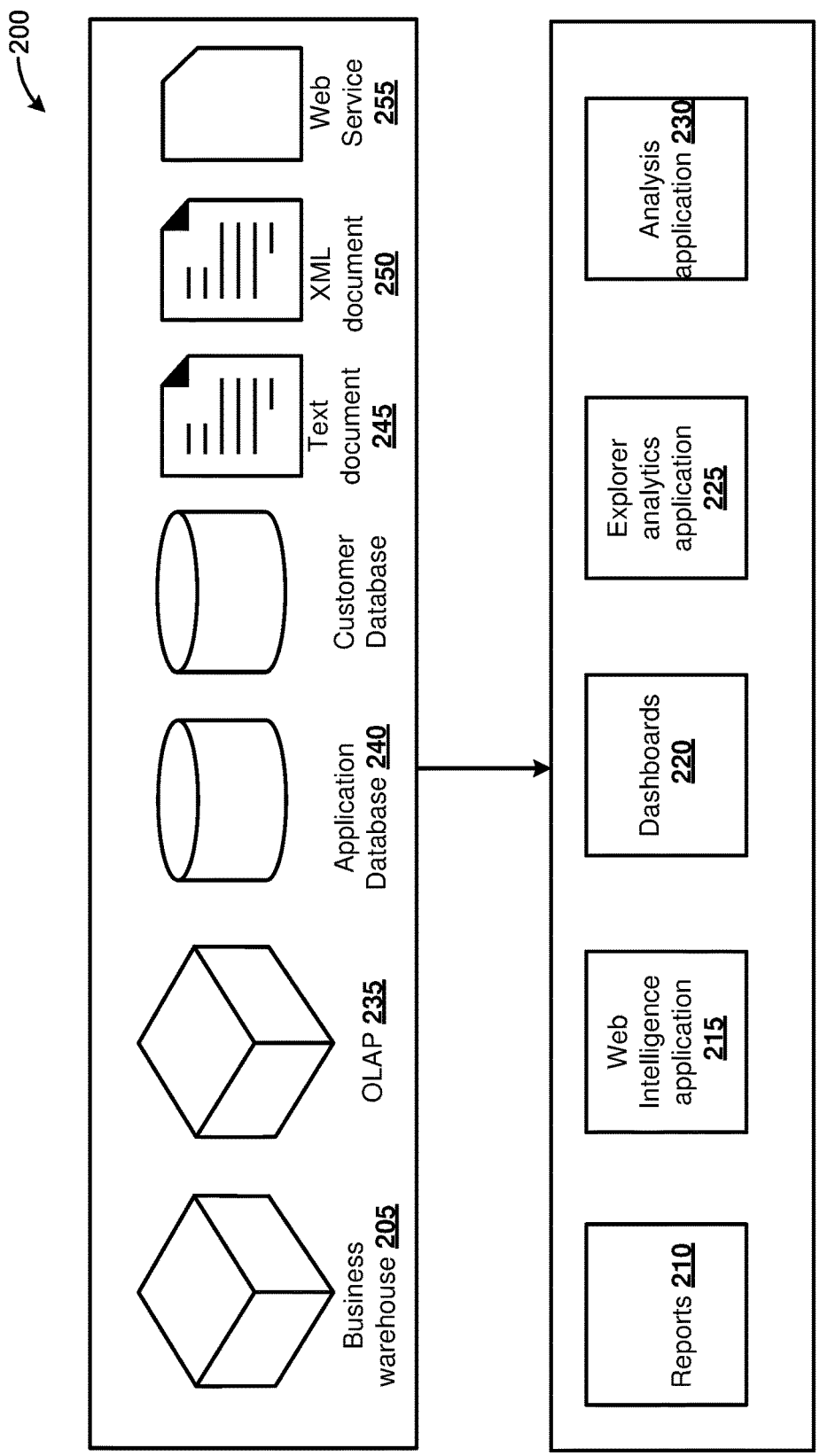
FIG. 2 is a block diagram illustrating exemplary objects used in impact analysis of objects, according to an embodiment.

FIG. 2 is a block diagram illustrating exemplary objects 200 used in impact analyses of objects, according to one embodiment. Consider a scenario where a change or modification occurs in one of the attributes of a business warehouse 205, this change may affect multiple objects or entities such as reports 210, web intelligence application 215, dashboards 220, explorer analytics application 225, analysis application 230, etc. Similarly, a change or modification in an attribute or object of one of the entities such as online analytical processing cube (OLAP) 235, application database 240, text document 245, XML document 250, or a web service 255, may have a ripple effect and may impact multiple dependent entities or objects associated with it. Some entities are impacted directly and as well indirectly because of the dependency on an impacted entity.

Figure 3:
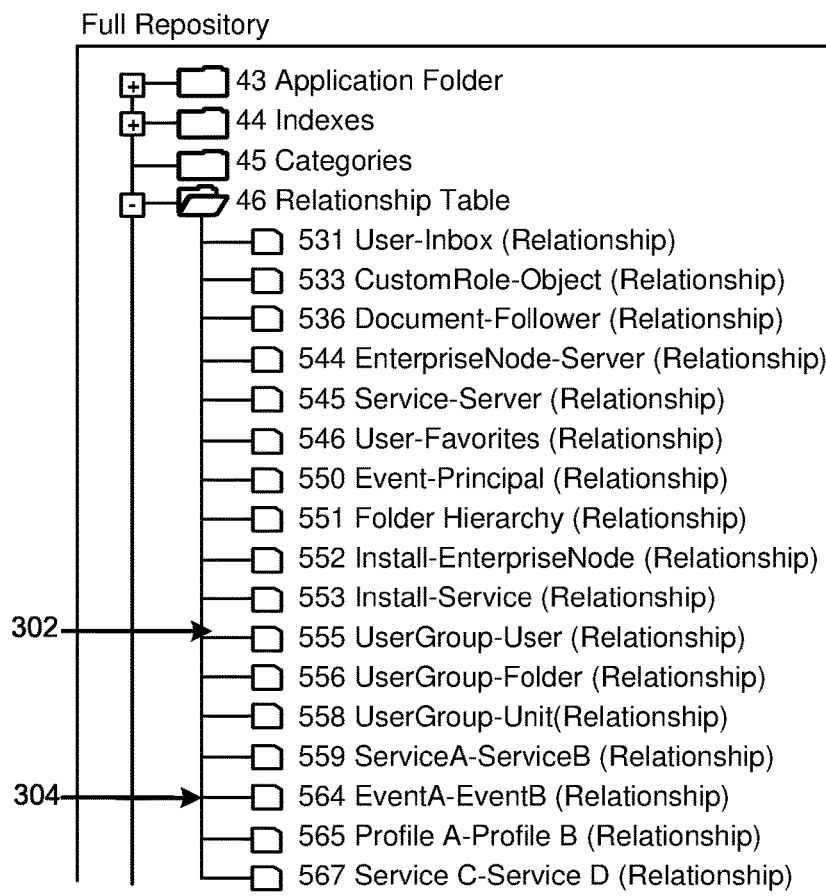
FIG. 3 illustrates exemplary relationship table maintained in a BI application, according to an embodiment.

FIG. 3 illustrates exemplary relationships maintained in a BI application, according to one embodiment. Relationships are set of rules that represent the dependency of objects. The relationships between various objects are maintained in the relationship table 300. For example, users belong to a user group, and the relationship between user object and user group object is specified in the relationship table as entry '555 UserGroup-User (Relationship)' 302. Similarly, the relationship between eventA and eventB is specified in the relationship table as entry '564 EventA-EventB (Relationship)' 304.

Figure 4B:
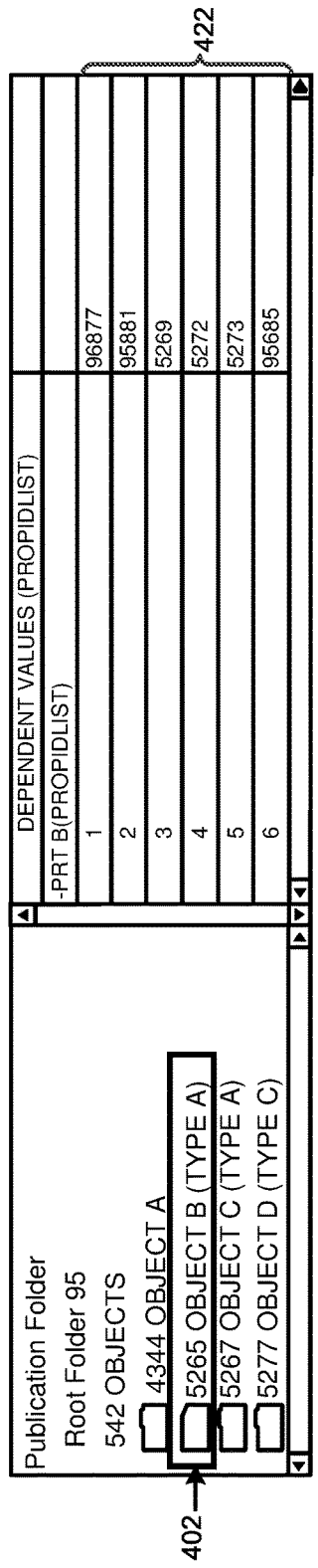
Figure 4B:
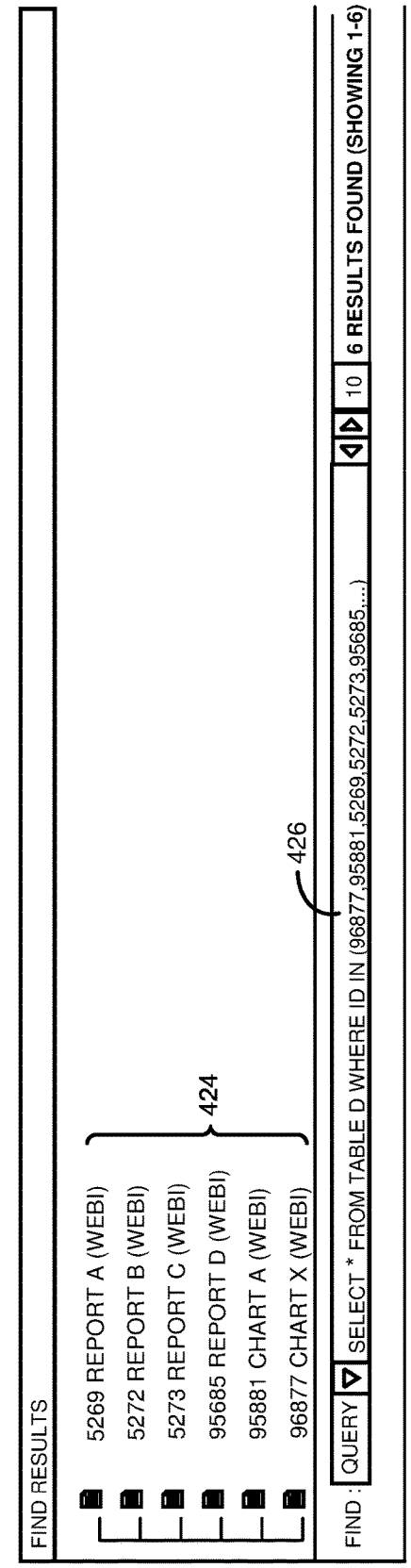

By way of example, an algorithm to perform impact analysis of objects is illustrated below with reference to FIG. 4A and FIG. 4B, where 400A and 400B are block diagrams in combination illustrate impact analysis, according to one embodiment. Select an object for impact analysis to determine the impacted objects. For example, select an object '5265 object B (type A)' 402 from a list of available objects. A type of the selected object '5265 object B (type A)' is determined. For the selected 'object B' object, type is determined as 'type A'. A query is formulated to retrieve relationship objects matching the type 'type A' for the selected 'object B' object from a relationship table. For example, query 404 is formulated as:
SELECT * FROM TABLE A, TABLE B, TABLE C WHERE NAME LIKE "%-Type A' AND RELATION_TABLE_NAME=RELATIONSHIP$_{13}$ TABLE Query 404 is formulated to select relationship objects from various BI tables such as table A, table B and table C, that matches the type of the object 'type A'. The formulated query is executed, and the relationship objects '555 Usergroup-User (Relationship)' 406, '559 ServiceA-ServiceB (Relationship) 408' and '564 EventA-EventB (Relationship) 410' are retrieved as shown in list 412. For the individual relationship objects retrieved, nested properties associated with the relationship objects are determined. For one such relationship object '555 Usergroup-User (Relationship)' 406, the nested properties are identified as shown in list 414. The nested properties in the list 414 are parsed to determine whether value of the nested property is of type 'type A'. In the nested properties 414 identified, 'relation_clause' 416 is determined to be of type 'type A' 418 as 'relation_clause=type-type A'. This determination assures that the relationship object retrieved is of type 'type A'. Upon determining that the value of the nested property is of type 'type A', the nested properties in the list 414 are parsed to identify a value of parent property as 'parent B' 420. A query is formulated to fetch dependent values corresponding to the parent property 'parent B' 420. The fetched dependent values for the parent property 'parent B' 420 are as shown in list 422 in FIG. 4B. Similarly, based on the steps noted above, dependent values are fetched for the remaining relationship objects '559 ServiceA-ServiceB (Relationship) 408' and '564 EventA-EventB (Relationship) 410'. The complete list of dependent values are retrieved and added to the list 422 (not shown). The object names corresponding to the dependent values are retrieved using a query, and displayed as impacted objects. Query 426 is formulated to retrieve object names:
SELECT * FROM TABLE D WHERE ID IN (96877, 95881, 5269, 5272, 5273, 95685)

Query 426 is formulated to select object names from BI table 'table D' where the dependent values in the list 422 are specified in the query. The impacted objects 424 are displayed as a result of execution of query 426. The impacted objects 424 can also be displayed in the form of a spider chart or radar chart as objects resulting from impact analysis of selected object 'object B'.

Figure 5:
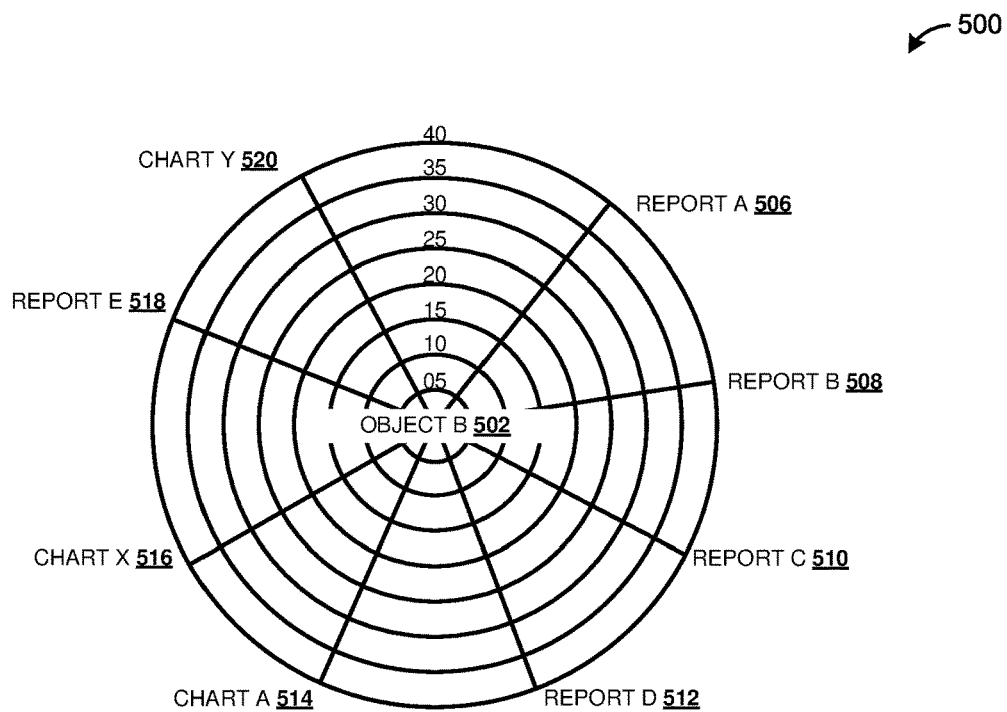
FIG. 5 is a graphical chart illustrating impact analysis of object, according to one embodiment.
Figure 5:
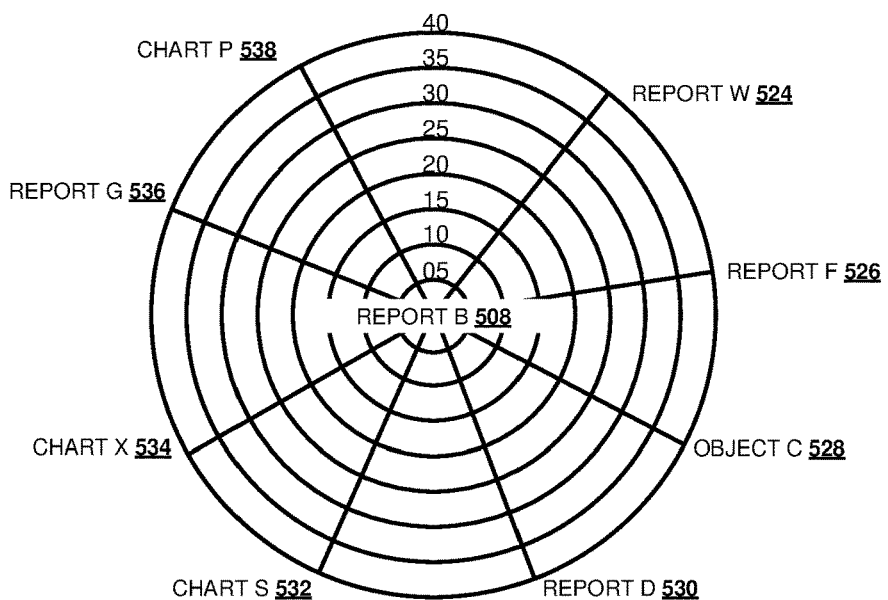

FIG. 5 is graphical chart 500 illustrating impact analysis of objects, according to one embodiment. When a user or administrator of the BI application performs impact analysis for an object, the impacted objects are available for view and further analysis in a user interface. The impacted objects identified corresponding to a selected object are displayed in a graphical chart such as radar chart in the user interface. For example, the selected object 'object B' 502 is in the center of the radar chart A 504. The impacted objects are plotted on spokes of the radar chart A 504. In the radar chart A 504, the impacted objects such as report A 506, report B 508, report C 510, report D 512, chart A 514, chart X 516, report E 518 and chart Y 520 are indicated in the spokes of the radar chart A 504. The selected object 'object B' 502 is in the center of the radar chart A 504. The user may select one of the impacted objects displayed, for example, report B 508, and right clicks on a context menu to select 'Perform impact analyze' (not shown). The algorithm as explained in FIG. 4A and FIG. 4B is re-executed, and impacted objects are identified corresponding to the selected object report B 508. The selected object report B 508 is displayed in the center of radar chart B 522, and the impacted objects are displayed in the spokes of the new radar chart B 522. In the radar chart B 522, the impacted objects such as report W 524, report F 526, object C 528, report D 530, chart S 532, chart X 534, report G 536 and chart P 538 are displayed in the spokes of the radar chart B 522.

Figure 6:
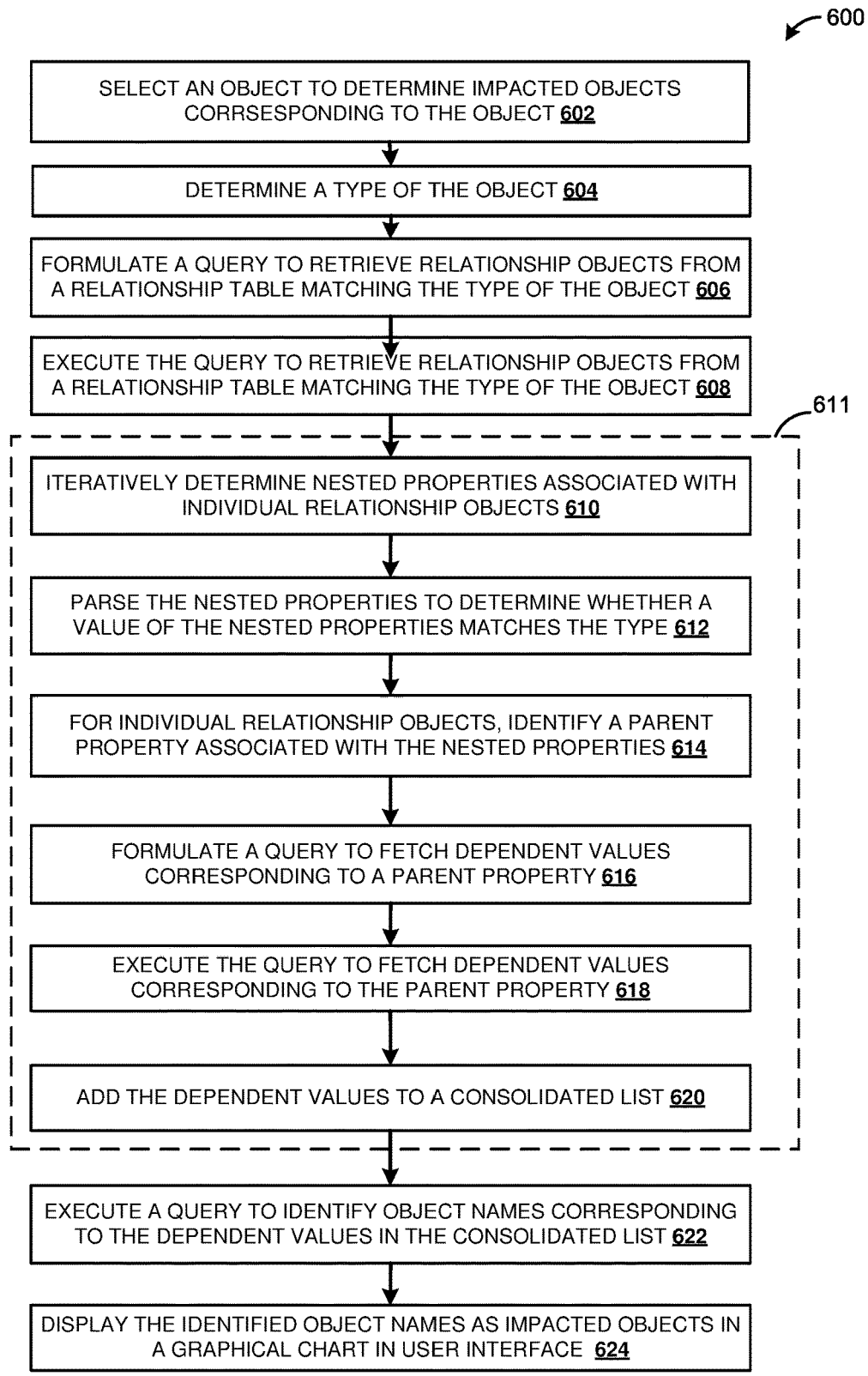
FIG. 6 is a flow diagram illustrating process of impact analysis of objects, according to one embodiment.

FIG. 6 is a flow diagram illustrating process 600 of impact analysis of objects, according to one embodiment. Process 600 of impact analysis of objects may be executed in an enterprise system, where the enterprise system may be a specialized enterprise hardware system with hardware components such as high speed processors, physical memory, hard drives, network connections, etc., capable of hosting and executing specialized enterprise software applications such as impact analysis application. At 602, an object is selected to determine impacted objects corresponding to the selected object. At 604, a type of the selected object is determined. At 606, a query is formulated to retrieve relationship objects from a relationship table matching the type of the selected object. At 608, the formulated query is executed to retrieve relationship objects from a relationship table matching the type of the selected object. At 610, nested properties associated with the relationship objects are iteratively determined as indicated in section 611. At 612, the nested properties are parsed to determine whether a value of the nested properties matches the determined type. Upon determining that the value of the nested property matches the determined type, at 614, a parent property associated with the nested property is identified. At 616, a query is formulated to fetch dependent values corresponding to the parent property. At 618, the formulated query is executed to fetch dependent values corresponding to the parent property. At 620, the dependent values are fetched iteratively for individual relationship objects, and added to a consolidated list. At 622, a query is executed to identify object names corresponding to the dependent values in the consolidated list. At 624, the identified object names are displayed as impacted objects in a graphical chart such as spider chart, radar chart, etc., in a user interface.

In one embodiment, object can be selected for impact analysis in a user interface of the BI application. The request is processed at a database layer such as in-memory database layer, and the results of the analysis are returned to the user interface of the BI application. In one embodiment, algorithm and the functionalities associated with the impact analysis feature can be packaged as add-on application and shipped with enterprise application such as BI applications. Users may choose to deploy or install impact analysis add-on application along with the BI application, and perform impact analysis from a user interface associated with the add-on application.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
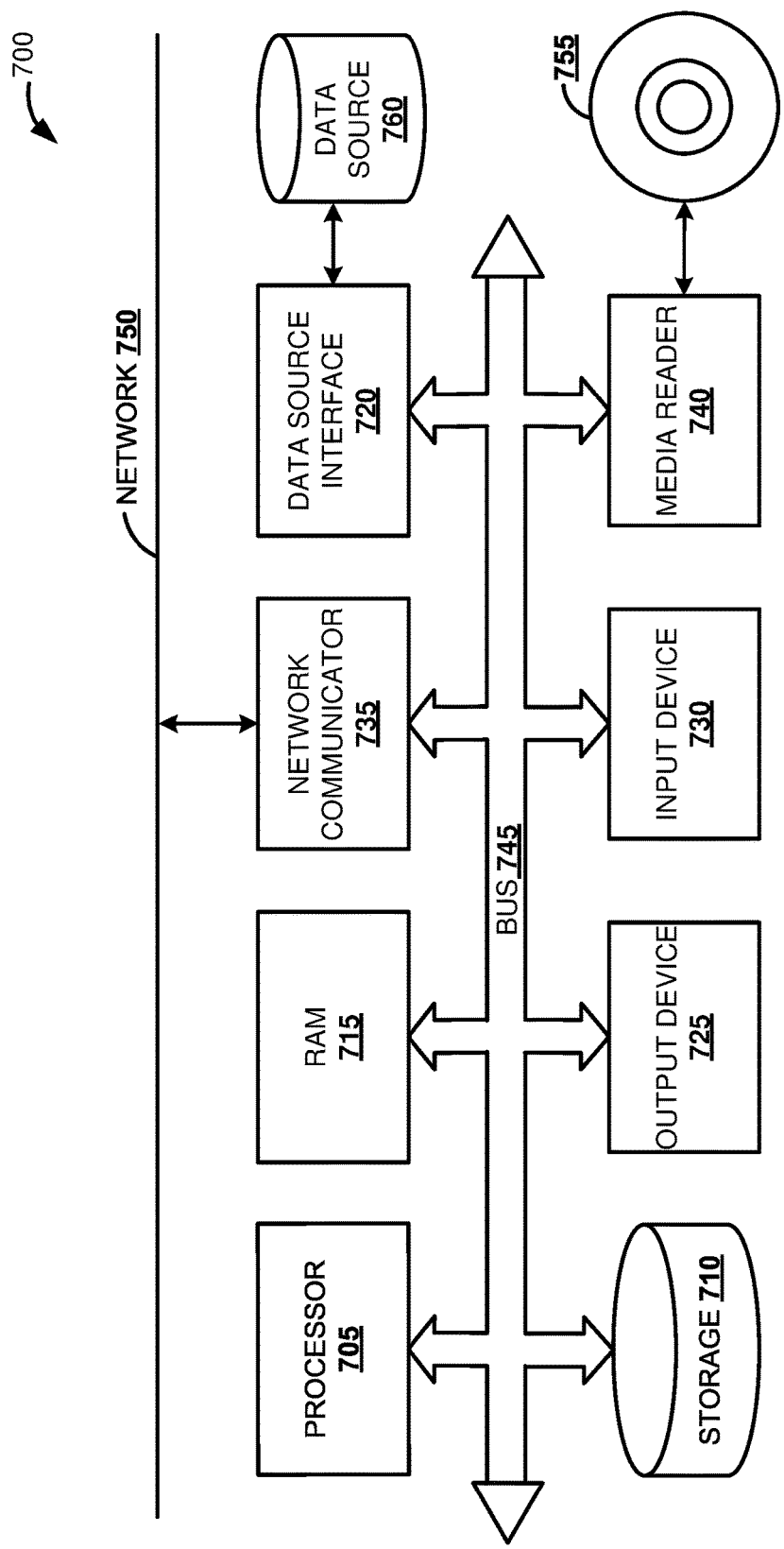
FIG. 7 is a block diagram illustrating an exemplary computer system, according to one embodiment.

FIG. 7 is a block diagram illustrating an exemplary computer system 700, according to an embodiment. The computer system 700 includes a processor 705 that executes software instructions or code stored on a computer readable storage medium 755 to perform the above-illustrated methods. The processor 705 can include a plurality of cores. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, all of the data required for processing may be stored in the RAM 715. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments and examples are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
   receive a selection of an object to determine impacted objects corresponding to the object from an enterprise system;
   determine a type of the object;
   execute a query at a database layer to retrieve a relationship object from a relationship table matching the type, wherein a relationship between the relationship object and another relationship object is set of rules that represent dependency of the relationship object;
   determine nested properties associated with the relationship object, wherein a nested property is parsed to determine whether a type value of the nested property matches the type of the object;
   identify a parent property associated with the nested properties;
   execute a query at the database layer to fetch dependent values corresponding to the parent property;
   execute a query at the database layer to determine impacted objects corresponding to the dependent values;
   render the impacted objects in a graphical spider chart;
   package an impact analysis application as an add-on package to an enterprise application; and
   deploy the impact analysis application as the add-on package to the enterprise application.

2. The computer-readable medium of claim 1, to store instructions, which when executed by the computer, cause the computer to perform operations:
   display the impacted objects in a graphical chart in a user interface.

3. The computer-readable medium of claim 2, to store instructions, which when executed by the computer, cause the computer to perform operations:
   select a new object in the graphical chart; and
   determine new impacted objects corresponding to the new object.

4. A computer-implemented method for impact analysis of objects, the method comprising:
   receiving a selection of an object to determine impacted objects corresponding to the object from an enterprise system;
   determining a type of the object;
   executing a query at a database layer to retrieve a relationship object from a relationship table matching the type, wherein a relationship between the relationship object and another relationship object is set of rules that represent dependency of the relationship object;
   determining nested properties associated with the relationship object, wherein a nested property is parsed to determine whether a type value of the nested property matches the type of the object;
   identifying a parent property associated with the nested properties;
   executing a query at the database layer to fetch dependent values corresponding to the parent property;
   executing a query at the database layer to determine impacted objects corresponding to the dependent values;
   rendering the impacted objects in a graphical spider chart;
   packaging an impact analysis application as an add-on package to an enterprise application; and
   deploying the impact analysis application as the add-on package to the enterprise application.

5. The method of claim 4, the method further comprising:
   displaying the impacted objects in a graphical chart.

6. The method of claim 5, the method further comprising:
   selecting a new object in the graphical chart; and
   determining new impacted objects corresponding to the new object.

7. A computer system for impact analysis of objects, comprising:
   a computer memory to store program code; and
   at least one processor to execute the program code, the program code instructing the at least one processor to:
      receive selection of an object to determine impacted objects corresponding to the object from an enterprise system;
      determine a type of the object;
      execute a query at a database layer to retrieve a relationship object from a relationship table matching the type, wherein a relationship between the relationship object and another relationship object is set of rules that represent dependency of the relationship object;
      determine nested properties associated with the relationship object, wherein a nested property is parsed to determine whether a type value of the nested property matches the type of the object;
      identify a parent property associated with the nested properties;
      execute a query at the database layer to fetch dependent values corresponding to the parent property;
      execute a query at the database layer to determine impacted objects corresponding to the dependent value;
      render the impacted objects in a graphical spider chart;
      package an impact analysis application as an add-on package to an enterprise application; and
      deploy the impact analysis application as the add-on package to the enterprise application.

8. The system of claim 7, wherein the program code further instructs the at least one processor to:
   display the impacted objects in a graphical chart.

9. The system of claim 8, wherein the program code further instructs the at least one processor to:
   select a new object in the graphical chart; and
   determine new impacted objects corresponding to the new object.

* * * * *